Figure 1:
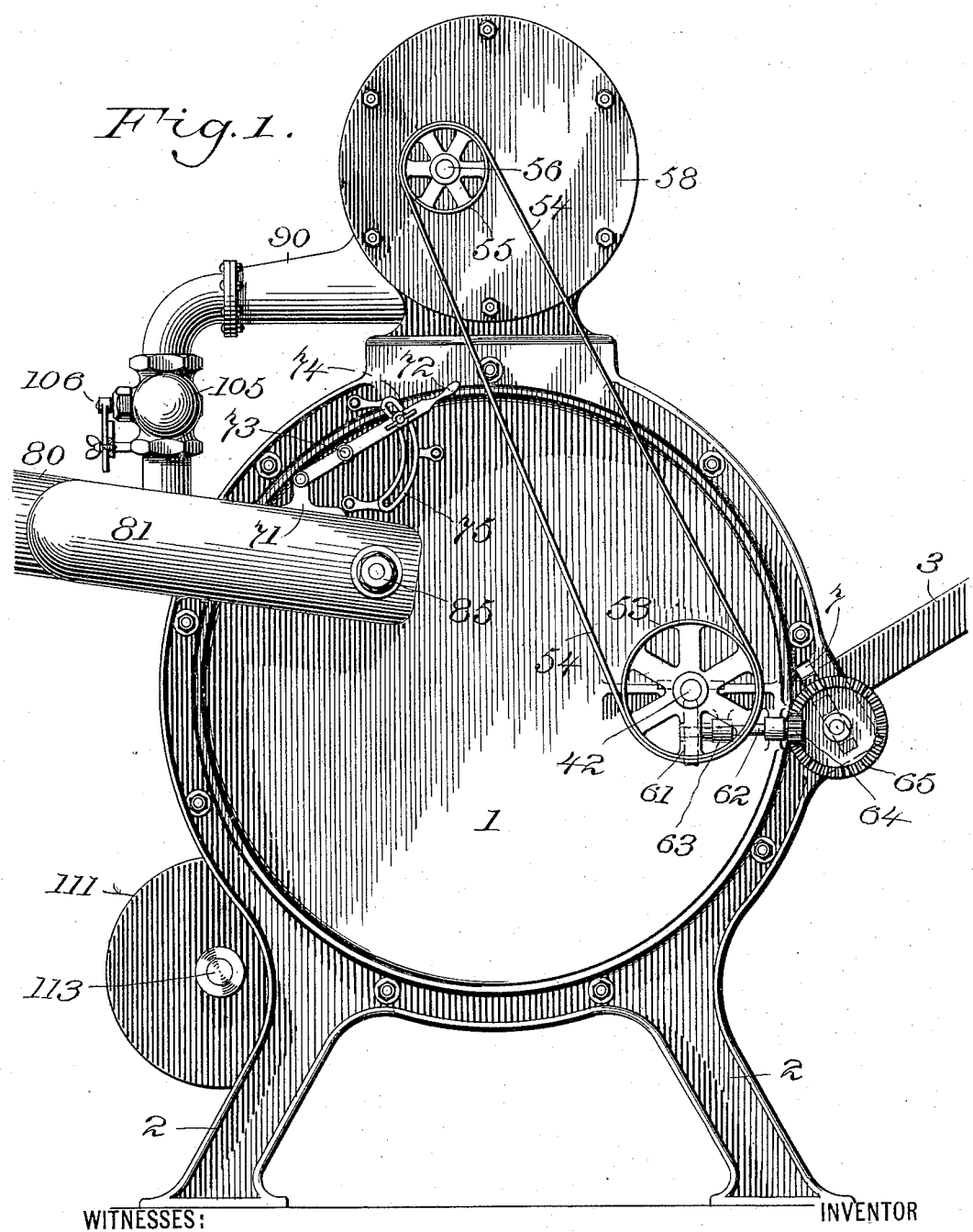

(No Model.) 5 Sheets—Sheet 1.

A. F. MADDEN.
MACHINE FOR REDUCING PITHY PLANTS.

No. 605,293. Patented June 7, 1898.

WITNESSES:
INVENTOR
Albert F. Madden
BY
Harry E. Knight
ATTORNEY (No Model.)

A. F. MADDEN.
MACHINE FOR REDUCING PITHY PLANTS.

No. 605,293.  Patented June 7, 1898.

WITNESSES:

INVENTOR
Albert F. Madden
BY
ATTORNEY (No Model.) 5 Sheets—Sheet 4.
A. F. MADDEN.
MACHINE FOR REDUCING PITHY PLANTS.
No. 605,293. Patented June 7, 1898.
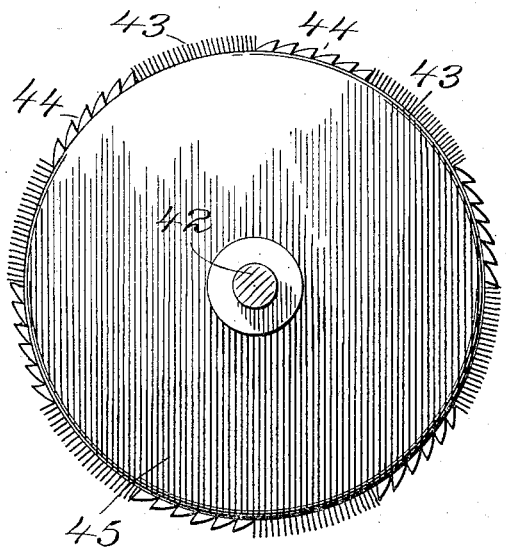
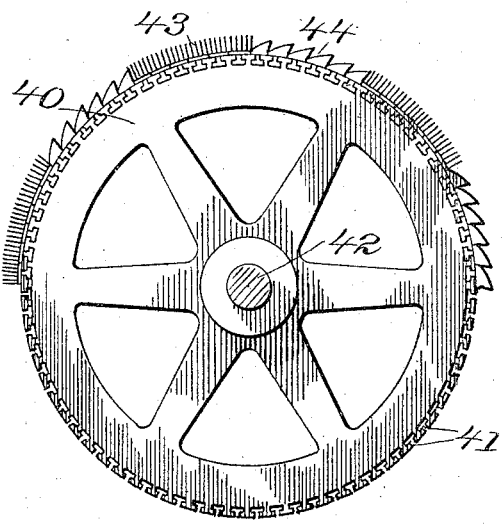
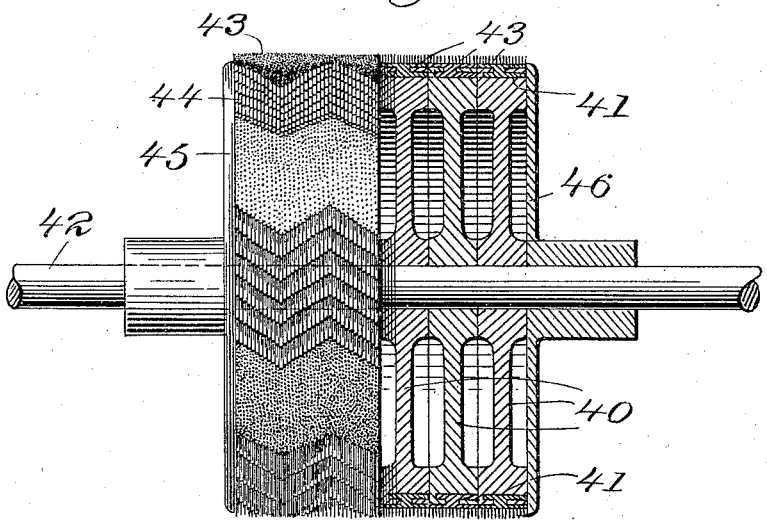
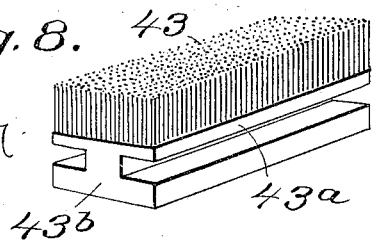
WITNESSES:
INVENTOR
Albert F. Madden
BY
Harry E. Knight
ATTORNEY (No Model.) 5 Sheets—Sheet 5.

A. F. MADDEN.
MACHINE FOR REDUCING PITHY PLANTS.

No. 605,293. Patented June 7, 1898.

WITNESSES:
W. H. Humphrey,
J. Green

INVENTOR
Albert F. Madden
BY
Harry C. Kn—
ATTORNEY

THE NORRIS PETERS CO., PHOTO-LITHO., WASHINGTON, D. C.

UNITED STATES PATENT OFFICE.

ALBERT F. MADDEN, OF NEWARK, NEW JERSEY, ASSIGNOR TO THE MARSDEN COMPANY, OF PHILADELPHIA, PENNSYLVANIA.

MACHINE FOR REDUCING PITHY PLANTS.

SPECIFICATION forming part of Letters Patent No. 605,293, dated June 7, 1898.

Application filed July 8, 1897. Serial No. 643,810. (No model.)

*To all whom it may concern:*

Be it known that I, ALBERT F. MADDEN, a citizen of the United States, residing at Newark, county of Essex, and State of New Jersey, have invented certain new and useful Improvements in Machines for the Reduction of Pithy Plants, of which the following specification, taken in connection with the accompanying drawings, is a full, clear, and exact description.

The object of my invention is to provide a simple and effective machine for reducing and separating the pithy and the woody or fibrous portions of pithy plants, such as Indian corn or maize. Many attempts have been made to produce machines which will satisfactorily disintegrate and separate these parts of pithy plants; but such attempts have not been altogether successful. The machines for accomplishing this result have usually been constructed to first grind, cut up, or otherwise disintegrate the pithy plant as a whole and then convey the commingled disintegrated parts to pneumatic separating devices which were supposed to separate the flocculent pithy portions from the woody or fibrous portions of the plant by their difference in specific gravity. It has been difficult to satisfactorily separate these disintegrated portions of the plant, because when the parts are so finely broken or cut up and mingled in a mass of dust or powder it is necessary to use such a strong separating air-current to separate and carry off the pithy portions that many small particles of the woody or fibrous portions of the plant will also pass off from the separator with the light flocculent pithy parts. Another serious defect in prior machines has been due to the use of suction-fans for generating the air-currents in the separators. A suction-fan in a separator produces unsteady gyrating or whirling air-currents in the separator, which tend to mix up the small disintegrated pithy and woody particles of the plants and render it impossible to produce a perfect separation of these parts. This defect is more serious in a machine of this character than in other kinds of pneumatic separators, because of the slight difference in specific gravity between the pithy and woody portions of the pithy plants. Such gyrating or whirling air-currents are also objectionable because they cannot be regulated down to the required gentle currents which are necessary to separate the pith from the woody portions of the plant.

Probably the most prominent patents recently granted in this art are those of Mark W. Marsden, of Philadelphia, Pennsylvania, No. 572,019, of November 24, 1896, for a corn product and process of making same, and No. 572,019, of November 24, 1896, for reduction of pithy plants, and my present invention is an improvement on the reduction-machine covered by the last-named patent.

The Marsden machine, though superior to all prior machines of its kind, possesses to a degree the objectionable features above pointed out of commingling the disintegrated pithy and woody portions of the plants before subjecting them to the action of the separator and of employing a suction-fan for generating the air-currents in the separator; but these objections are largely counteracted by subjecting the products to a supplementary separating action, which produces fairly good results. In my present invention I have obviated these difficulties to a great extent and have produced and demonstrated practically a simple form of machine which will give more satisfactory results.

I accomplish my objects by constructing a machine with a disintegrating mechanism mounted within or having its discharge end inclosed by a separator-chamber, from which the air laden with the light pithy portions of the disintegrated plant is constantly exhausted by a suitable ejector air-exhausting mechanism. By this arrangement it will be clear that the instant the particles of the plant are cut or broken off from the stalks they will be subjected to the separating action of the air in the separating-chamber, and it will therefore be impossible for the disintegrated parts to become commingled in a mass of dust or powder and a much gentler air-current can be employed for effecting the separation. Furthermore, by employing an ejector air-exhausting mechanism I produce a steady direct current of air through the separator-chamber which does not mix up the pithy and woody particles, but simply takes away the light flocculent pithy particles from the disintegrated plants while they are passing from the disintegrator in a semifloated state. This result is further assisted by the peculiar construction of the disintegrating mechanism. The disintegrator is formed of a rotating roll or cylindrical body provided with alternately-arranged series of saws or cutters and wire brushes, the wires of the brushes projecting radially slightly beyond the cutting edges of the saws or cutters, so that they will operate upon the stalks of the plants before the cutters and tend to scratch or scrape out the pithy portions of the plants before the fibrous parts are cut up or disintegrated by the saws or cutters. Coöperating with this rotary disintegrator I preferably employ suitable feed-rolls, which feed the stalks of the plants toward the periphery of the disintegrator-cylinder, the ends of the stalks resting upon an adjustable plate by which they are held up against the rapidly-revolving disintegrator-roll while they are disintegrated.

The separating-chamber is preferably of cylindrical shape, with an air-exhausting passage or passages leading from it adjacent to the top for the outlet of the air laden with the light flocculent pithy portions of the plant, and a valved outlet-opening adjacent to the bottom for the passage of the heavier woody or fibrous portions of the plant. The exhaust or ejector openings leading from the separating-chamber adjacent to the top lead to a common exhaust pipe or passage, into which projects an air-blast pipe leading from the air-ejector in the form of a rotary blower, the blast from which exhausts or sucks the air from the separating-chamber. I preferably provide a rotating discharge wheel or valve in the outlet-passage in the bottom of the separating-chamber to continuously discharge the woody portions of the plant and prevent the entrance of air at this point. The discharge wheel or valve also imparts a gentle undulatory movement to the mass of woody portions at the bottom of the separator-chamber to allow any articles of pith to float off which may have fallen with the woody particles.

My improved machine has other valuable features of construction, and I will now proceed to describe the entire machine, with particular reference to the accompanying drawings, and will afterward point out the novelty more particularly in the annexed claims.

Figure 2:
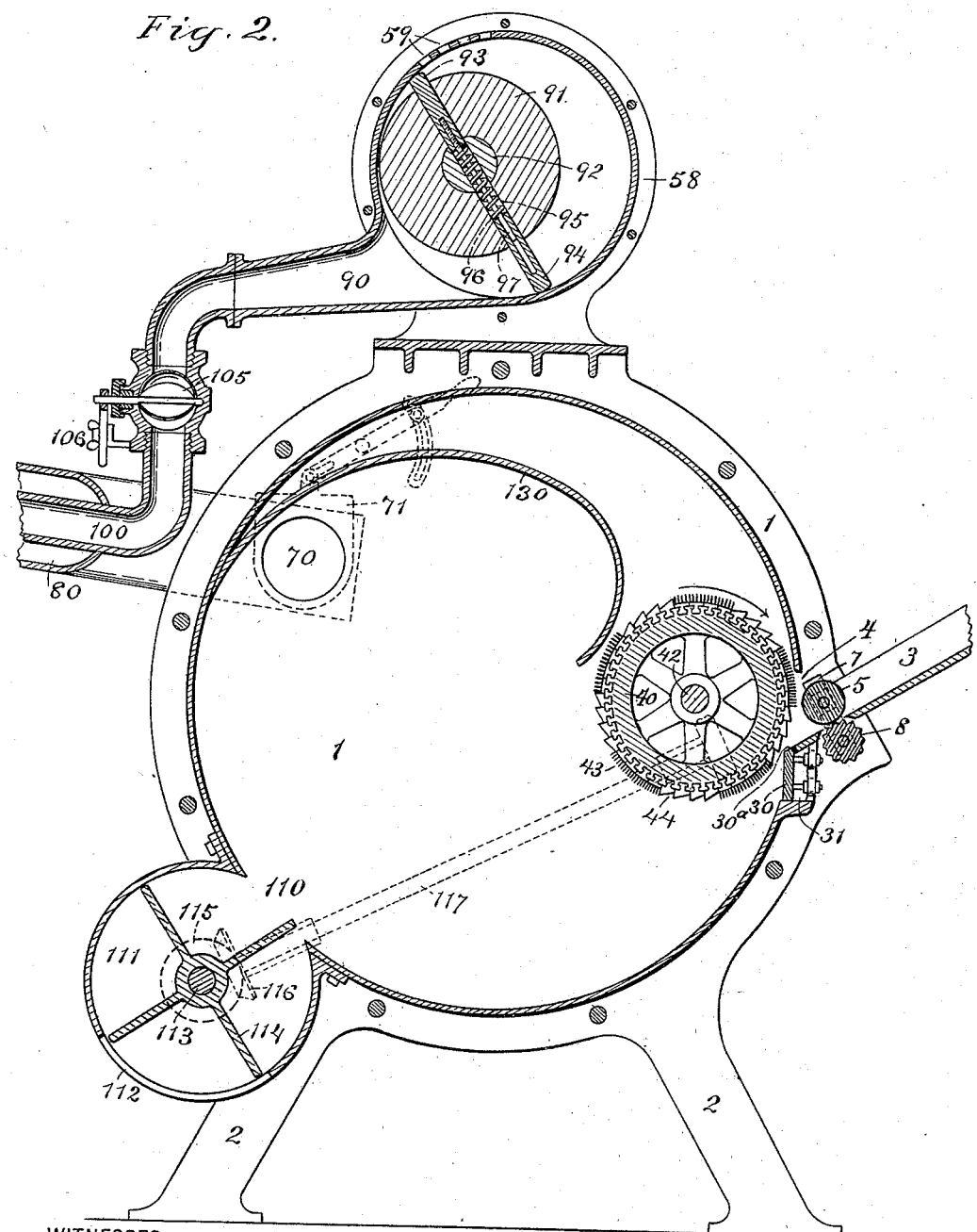
Figure 3:
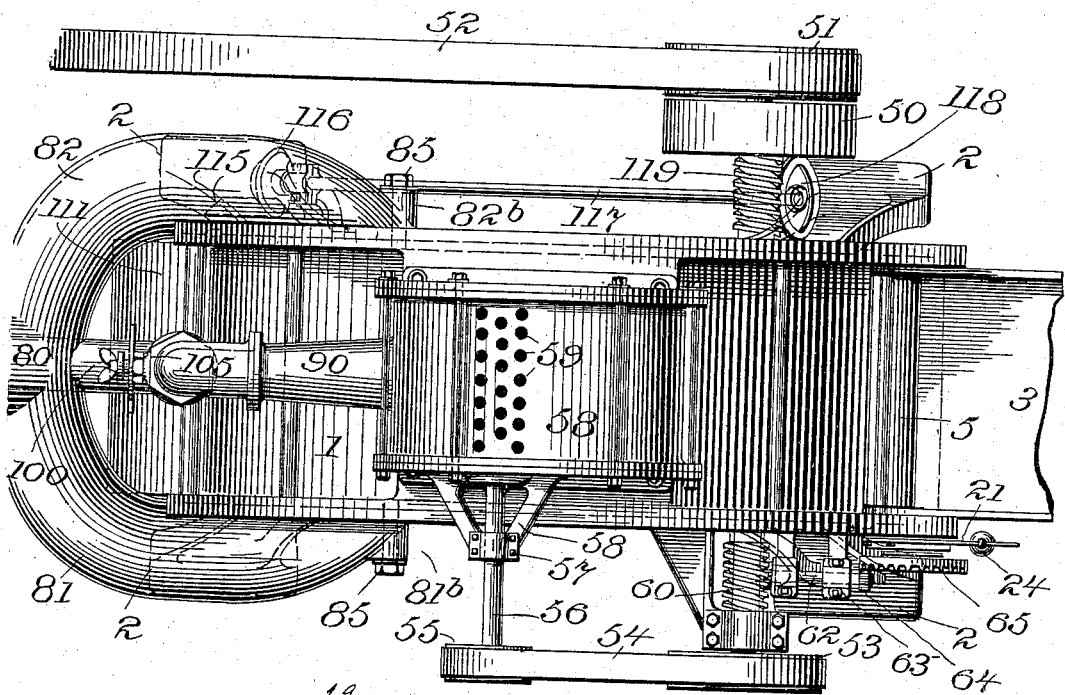
Figure 4:
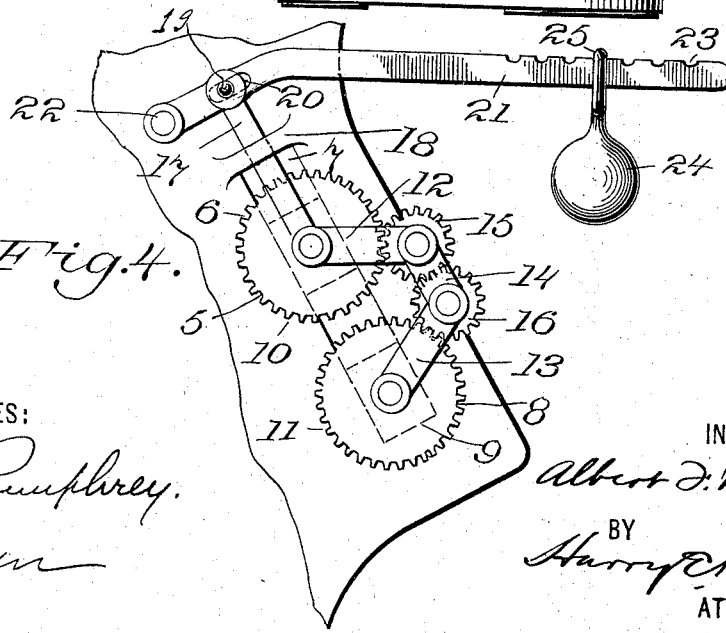
Figure 9:
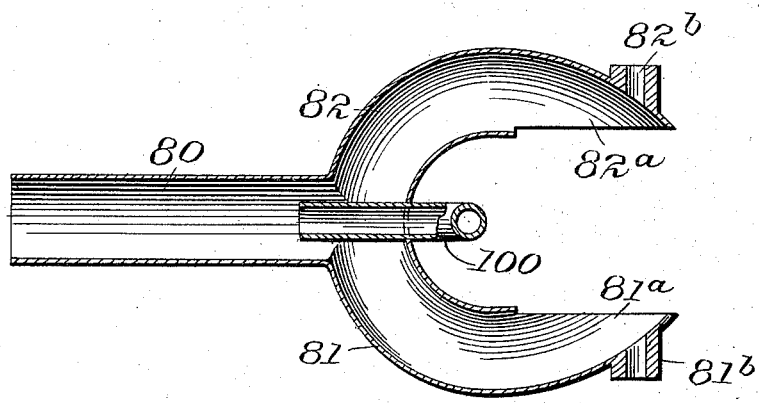
Figure 10:
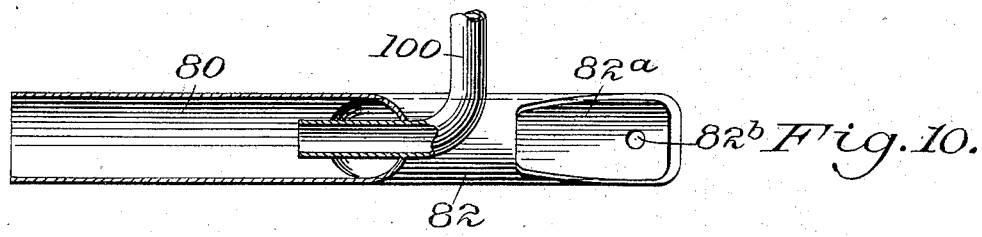
Figure 11:
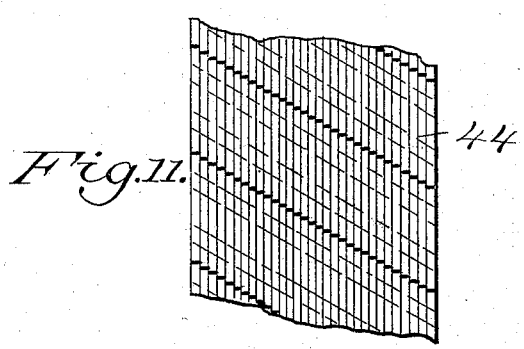
Figure 12:
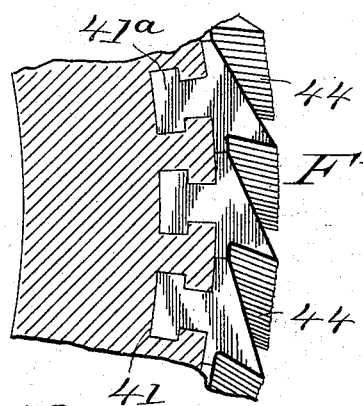
Figure 13:
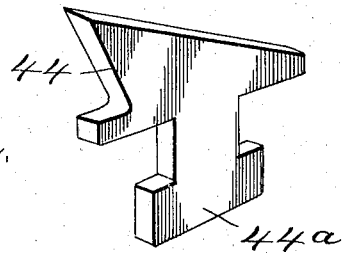

In said drawings, Figure 1 is a side elevation of my improved reducing and separating machine. Fig. 2 is a vertical longitudinal sectional view of the same. Fig. 3 is a top plan view of the same. Fig. 4 is an enlarged detail side elevation of mechanism for gearing the two feed-rolls together. Fig. 5 is an end view of the disintegrator-roll. Fig. 6 is a similar view with the end plate and parts of the saws or cutters and brushes removed. Fig. 7 is a front elevation, partly in section, of the disintegrator-roll. Fig. 8 is a detail perspective view of a section of wire brush. Figs. 9 and 10 are respectively a horizontal and a vertical sectional view of the air-exhausting pipe of the separator. Figs. 11 and 12 are respectively a detail plan and a detail sectional elevation of parts of the disintegrator-roll, showing the cutting-teeth. Fig. 13 is a perspective view of one of the cutter-teeth.

1 is a suitable cylindrical casing mounted upon the feet 2 and constituting the separating-chamber of my improved machine.

3 is an inclined supply-chute leading to an opening 4 in the separating-chamber 1, which opening is made through the casing of the chamber at the side thereof and extends to a considerable distance above the point of feed, so that the action of the air-ejector, hereinafter described, draws air in through said opening and past the disintegrator and the material upon which it is operating.

5 is a plain feed-roll journaled in bearings 6, which are vertically adjustable in the guide-slots 7 of the machine side frames, and 8 is a corrugated feed-roll journaled in bearings 9, supported in slots 7 below the plain feed-roll 5. The feed-rolls 5 and 8 are arranged in the path of the plant-stalks which are supplied to the chute 3 and are adapted to feed the plants to the disintegrator, hereinafter referred to.

10 is a cog-gear keyed to the journal at one end of roll 5, and 11 is a similar cog-gear keyed to the journal of the corrugated roll 8.

12 and 13 are arms journaled, respectively, upon the journal ends of the rolls 5 and 8, and 14 is a link pivotally connecting the ends of arms 12 and 13.

15 and 16 are small cog-gears meshing with each other and with the cog-gears 10 and 11, respectively, for causing the feed-rolls 5 and 8 to rotate in opposite directions for feeding the stalks between them.

17 is an arm pivoted to the journal of roll 5, extending up through the guide-bracket 18 and carrying a pin 19, which engages a slot 20 of the arm 21. The arm 21 is pivoted to the machine-casing at 22 and is formed with a series of notches 23, adjacent to its free end.

24 is an adjustable weight formed with a loop 25, which is mounted upon arm 21 and engages the notches 23. It will be observed that the weighted lever 21 holds the rolls 5 and 8 in working relation with a yielding pressure.

30 is an adjustable plate mounted in a pocket 31 beneath the opening 4 to the separating-chamber 1. The plate 30 has an upper beveled edge $30^a$, which is flush with the bottom of the supply-chute 3.

32 are adjusting screws or bolts adapted to regulate the position of the plate 30 with relation to the disintegrator, which I will now proceed to describe.

The disintegrator cylinder or roll is made up of a number of wheels or disks 40, formed with dovetail or T grooves 41 in their peripheries, which disks or wheels 40 are mounted upon a shaft or axle 42 in any suitable manner. The dovetail or T grooves 41 extend, preferably, at an incline to the axis of rotation of the wheels 40 in order that the cutting saw-teeth and brush-sections may be arranged in zigzag lines upon the surface of the cylinder or roll made up of the wheels 40.

43 indicates the brush-teeth, and 44 the cutting saw-teeth, the brush-teeth projecting radially beyond the cutting edges of the saw-cutters 44.

I prefer to make the cutters 44 of a series of separate teeth, as shown in Figs. 11, 12, and 13, each tooth being formed with a T-head $44^a$, which is adapted to be slid into engagement with one of the T-grooves 41. The brushes are preferably constructed in blocks or sections, such as shown in Fig. 8, in which the wires 43 are mounted upon base $43^a$, which is cast around their ends and is formed with a T-head $43^b$, adapted to be slid into engagement with one of the grooves 41.

In building up a disintegrator cylinder or roll it will be observed that the disks or wheels 40 are preferably arranged so that their T-grooves 41 will incline alternately in opposite directions to form zigzag grooves across the periphery of the roll or cylinder. It will of course be clear that in doing this the cutter-teeth and sections of brushes must be inserted in their proper grooves in each wheel or disk before they are assembled.

45 and 46 indicate the circular plates or heads which form the ends of the disintegrator cylinder or roll.

The disintegrator, with the alternately-arranged cutters and wire brushes, is mounted upon the shaft 42, which is journaled in suitable bearings in the sides of the separator-casing 1. At one end of the shaft 42 is mounted the fast and loose pulley 50 and 51, upon which operates a power-belt 52, by which the whole machine is driven. At the opposite end of the shaft 42 is a belt-pulley 53, around which passes a belt 54, which operates a band-pulley 55, keyed to the projecting end of the shaft 56, journaled in bearings 57 of the casing 58 of an air-blower, hereinafter more particularly referred to.

60 is a worm keyed to the shaft 42, and 61 is a worm-wheel keyed to a short shaft 62, journaled in bearings 63, and provided at its forward end with a small cog-gear 64, which meshes with a large gear 65, keyed to a projecting journal on the lower feed-roll 8. By this means the feed-rolls are driven from the disintegrator-shaft 42.

70 indicates one of the exhaust-openings in the sides of the separator-chamber 1, adjacent to its top. These exhaust-openings are controlled by the slide-valve plates 71, to each one of which is pivoted an operating-lever 72, pivoted at 73 and carrying a locking-bolt 74, which works in a slotted segment-bracket 75. By means of the levers 72 and their securing devices the valves 71 can be secured in any desired position to regulate the flow of air and light pithy particles from the separating-chamber.

The exhausting-passages leading from the openings of the separating-chamber are preferably in the form shown in Figs. 9 and 10, in which they consist of a main ejector discharge-pipe 80, forming a continuation of the two branch pipes 81 and 82, which straddle the separating-chamber and have openings $81^a$ and $82^a$ in communication with the exhaust-openings 70, above referred to. The exhaust-pipe 80 81 82 is secured to the machine by suitable bolts 85, passing through the perforated bosses $81^b$ and $82^b$.

Mounted upon the top of the main casing 1 of the separating-chamber is the casing 58 of the ejector air-blower. The casing 58 has a series of air-inlet openings 59 in its top and an air-outlet passage 90, leading from the bottom at one side. Within the casing 58 is an eccentrically-journaled cylindrical head 91, mounted upon the shaft or axle 92, the periphery of the cylindrical head 91 being in close relation to the interior surface of the cylindrical casing 58, just above the outlet-passage 90.

93 and 94 are the buckets or paddles of the blower, which buckets or paddles are mounted in a guide slot or way 95, extending diametrically through the cylindrical head 91. The buckets or paddles 93 and 94 have the spiral springs 96 located between them upon rods 97, which rods are secured in the paddle 93 and work freely in openings formed in the paddle 94. By this construction it will be clear that the paddles 93 and 94 will move inwardly and outwardly in the head 91 as it rotates in the casing 58. The discharge-passage 90 of the blower communicates with a blast-pipe 100, which projects into the exhaust-passage 80 at the junction of the branch pipes 81 and 82 for directing the blast of air into the passage 80 and sucking or exhausting the pith-laden air from the separating-chamber 1. For regulating the force of the blast from the blower I provide a damper-valve 105 with a device, such as 106, for securing it in adjusted position.

110 is an outlet-opening adjacent to the bottom of the separating-chamber 1, and 111 is a small cylindrical casing secured to the main casing 1 over the opening 110 and formed with a similar outlet-opening 112. Mounted upon a shaft 113 is a wheel carrying a series of radial plates or buckets 114, which are adapted to rotate within the casing 111 and automatically remove the heavier particles of the disintegrated plants, which fall into openings 110 upon the plates or buckets 114, and at the same time prevent the entrance of air to the separating-chamber. For operating the rotating wheel carrying the plates or buckets 114 I provide the shaft 113 with a bevel-gear 115, with which meshes a similar bevel-gear 116, keyed to the lower end of an inclined shaft 117, carrying at its upper end a worm-wheel 118, which meshes with a worm 119, keyed to the shaft 42.

The operation of the machine is as follows: The stalks of the corn or other pithy plants to be treated are supplied to the chute 3 and are fed by the feed-rolls 5 and 8 against the rapidly-revolving disintegrator-roll, the ends of the stalks being supported by the adjustable plate 30. The brush-wires 43 project radially beyond the cutting saw-teeth 44 and tend to rip the woody or fibrous portions of the stalks and scrape or scratch out the pithy portions in a fine granular condition. The saw-cutters then cut the woody portions into fine particles. As the fine particles of pith are torn from the stalks they are thrown into the separating current of exhausting air in the separating-chamber which is constantly flowing in through opening 4, around the disintegrator-roll, up through the separating-chamber, and out the exhaust-openings 70. The heavier woody or fibrous portions of the plant are too heavy to pass off with the air-current and fall to the bottom and are discharged through opening 110. The uniform and steady exhaust air-current is generated by the ejector or blower and can be regulated to a nicety with the valves 71 and 105, so that the separation of the pithy portions from the woody portions of the plant will be perfectly satisfactory. The rotation of the discharge valve or wheel imparts an undulatory motion to the mass of disintegrated woody portions and frees from the mass any particles of pith which may have been carried to the bottom of the chamber and allows such particles of pith to float off through the exhaust-passage.

The successful result of my improved machine is due largely to the facts that I employ an ejector-blower for generating the air-current and every particle of the disintegrated plant is subjected to the separating action of the air-current the moment it is cut from the stalk.

130 is a curved guard or shield secured within the cylindrical separating-chamber and extending from the side of said chamber adjacent to the exhaust-openings over to and partially around the disintegrating-roll. The purpose of the guard or shield is to prevent the currents of air above the disintegrator-roll and direct the currents of air beneath the roll where the disintegrated material falls from the disintegrator.

Having thus fully described my invention, the following is what I claim as new therein and desire to secure by Letters Patent:

1. A machine for reducing pithy plants, comprising a separating-chamber having an opening for the passage of plant material, feeding and supporting devices adjacent to said opening for feeding the plant material through the opening and supporting it in position to be operated upon by the disintegrator, a rotary disintegrator having alternate groups of cutting-teeth and wire brushes, and an air-ejector communicating with the upper part of the separating-chamber to remove the lighter parts of the disintegrated plant, said separating-chamber having an opening in its lower part for the removal of the disintegrated fiber.

2. In a machine for reducing pithy plants, the combination of a separating-chamber, a disintegrating mechanism discharging into the separating-chamber, an outlet adjacent to the bottom of the separating-chamber for the discharge of the heavier particles, an outlet adjacent to the top for the discharge of the lighter particles, air-exhausting mechanism communicating with the outlet for the lighter particles, a valve controlling the air-exhausting mechanism, and a suitable valve controlling the said exhaust-outlet for lighter particles, as set forth.

3. A machine for reducing pithy plants, comprising an approximately cylindrical separating-chamber, an inlet-opening for the plants, a disintegrating mechanism in the separating-chamber into which the plants are fed through the inlet, an outlet for heavier particles in the lower part of the separating-chamber, and a shield or guard within the separating-chamber extending from the exhaust-outlet partially around the disintegrating mechanism, as set forth.

4. A machine for reducing pithy plants, comprising a disintegrating roll or cylinder having a series of cutting-teeth and wire brushes arranged alternately circumferentially upon the periphery of the roll or cylinder, the brush-wires extending radially beyond the working edges of the cutting-teeth, and an adjustable plate upon which the plants are supported against the action of the disintegrating-roll, as set forth, in combination with a chamber containing said disintegrating-roll and having an opening through which fibrous plant material may be fed to the disintegrator, and an air-ejector communicating with the upper part of said chamber.

ALBERT F. MADDEN.

Witnesses:
HARRY E. KNIGHT,
WM. E. KNIGHT.